United States Patent Office.

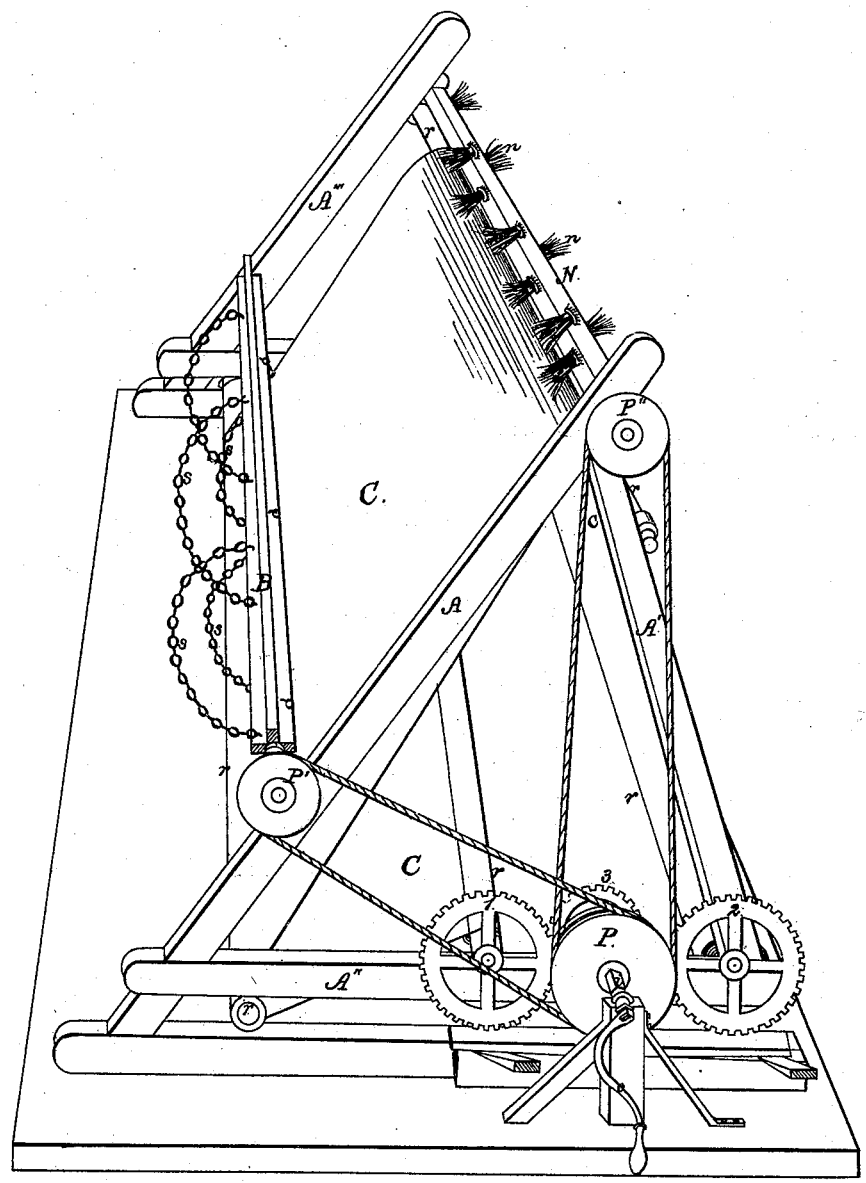

THOMAS JORDAN, OF BROOKLYN, NEW YORK.

Letters Patent No. 93,718, dated August 17, 1869.

IMPROVEMENT IN CARPET-BEATER.

The Schedule referred to in these Letters Patent and making part of the same.

*To all whom it may concern:*

Be it known that I, THOMAS JORDAN, of the city of Brooklyn, in the county of Kings, and State of New York, have invented certain new and useful Improvements in Machinery for Beating Carpets; and I hereby declare that the following is a full, clear, and exact description thereof, reference being had to the accompanying drawings, which are lettered to correspond with and form a part of the specification.

To enable the public to understand the nature of my invention, and those who are skilled in mechanics to construct and operate the same, I describe it as follows, to wit:

Figure 1 is a perspective drawing of my metallic carpet-beating apparatus.

A A′ A″ A‴ is the frame-work that supports the horizontal rollers or reels r r r r, upon which the carpet C is wound, prior to, and after having been dusted, by the revolving slack chains s s s s s, secured to the quadruple angle-bar B, which is revolved by the action of the pulleys P and P′, by means of the crank or any other suitable power that will give the desired rotary or revolving motion to the chain beaters s s s s s, and the larger pulley P imparts the revolving movement to the brush-reel N.

By means of the smaller pulley P″, gear-wheel 3 is horizontally adjusted upon the axes i, to be flung in or out of gear with the other two gear-wheels 1 and 2, for the purpose of winding up or relaxing the carpet while upon the reels r r r r.

I am aware that wooden arms or beaters, secured to and operated by revolving cast-metal wheels, are in common use for beating or dusting carpets. Ropes have been used in combination with machinery for a similar purpose. The former is rigid and liable to injure the fabric, particularly if much worn, by cutting holes in the same. The latter is not sufficiently heavy unless a very large rope is used, and it is constantly wearing or fraying out; but by my application of small trace-chains, arranged upon the revolving bar B, I am enabled to produce flexible metallic beaters, having all the preponderance of weight obtained by the wooden arms as well as the pliability of the rope, without the defective properties of either.

I also arrange a series of revolving brushes upon the shaft or reel N, to remove the loose dust from the carpet C.

Therefore the novelty of my invention consists in the arrangement and use of small chains s s s s s, operated by any suitable gearing over the surface of the carpet C, in combination with the revolving brushes n n n n, or separately arranged, to suit the exigencies of the situation. Therefore,

What I claim as my improvement, and desire to secure by Letters Patent, is—

The chains s, attached to bar B, in combination with cords and pulleys P′ P P″, adjustable gearing 1, 2, 3, rollers r r, and revolving brushes n, as herein described, for the purpose set forth.

In testimony whereof, I hereunto subscribe my name, in the presence of two witnesses.

THOMAS JORDAN.

Witnesses:
JAMES P. McLEAN,
JOHN R. McLEAN.